Aug. 23, 1932.　　　C. H. JOHNSON ET AL　　　1,872,959
AUTOMOBILE JACK
Filed March 27, 1929　　2 Sheets-Sheet 1

INVENTORS.
Charles H. Johnson,
Arthur E. Miller,
BY
Townsend, Loftus & Abbett
ATTORNEYS.

Aug. 23, 1932.   C. H. JOHNSON ET AL   1,872,959
AUTOMOBILE JACK
Filed March 27, 1929   2 Sheets-Sheet 2
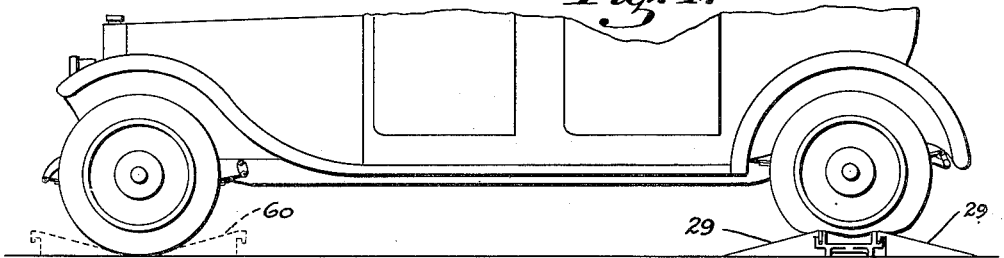
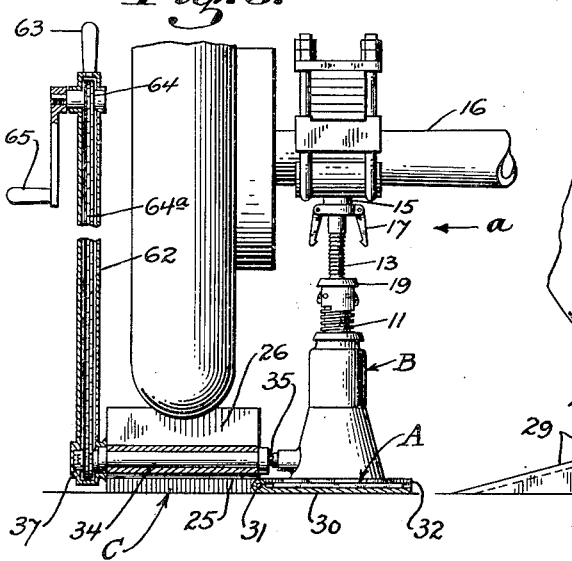
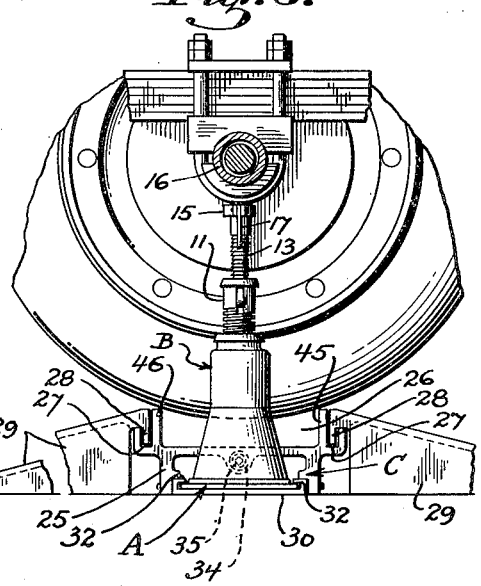
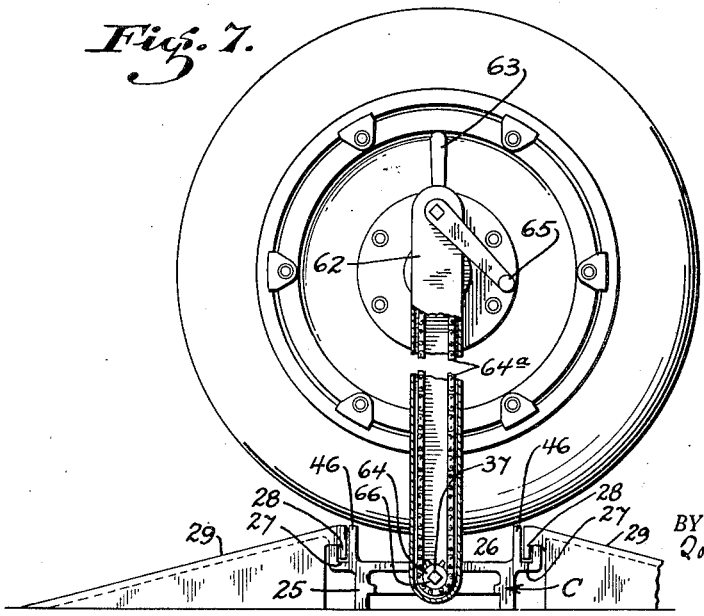
INVENTORS.
Charles H. Johnson,
Arthur E. Miller.
BY Townsend, Loftus & Ahett
ATTORNEYS.

Patented Aug. 23, 1932

1,872,959

UNITED STATES PATENT OFFICE

CHARLES H. JOHNSON AND ARTHUR E. MILLER, OF SACRAMENTO, CALIFORNIA

AUTOMOBILE JACK

Application filed March 27, 1929. Serial No. 350,186.

This invention relates to improvements in automobile jacks, and provides means for first elevating a wheel a predetermined distance from the ground surface before the jack is operated; secondly it provides means for supporting the jack and centering it with relation to the axle housing; and third it provides means which permit operation of the jack from one side or another of the automobile.

The object of the present invention is to generally improve and simplify the construction and operation of automobile jacks; to provide an inclined runway up which the wheel is run to a saddle block which stops further movement of the wheel and retains it in a temporary elevated position; to provide an extensible base member to receive and support the jack and to center the jack with relation to the saddle block and the axle housing, and further to provide a driver which extends through the saddle block and into the jack, whereby the jack may be operated to complete elevation of the wheel from one side or another of the automobile.

Figure 1:
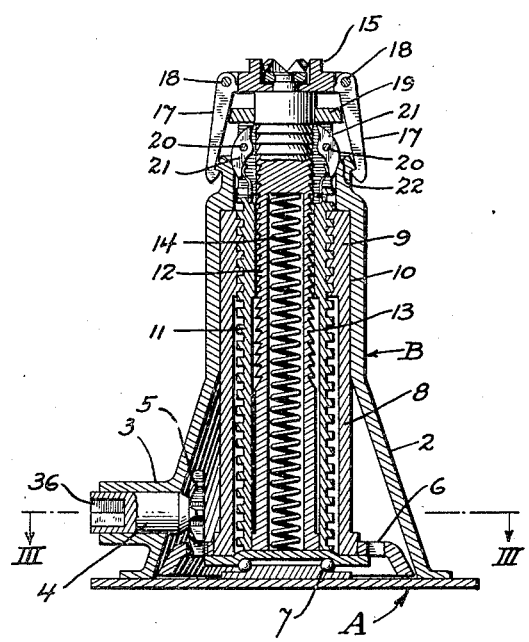
Figure 2:
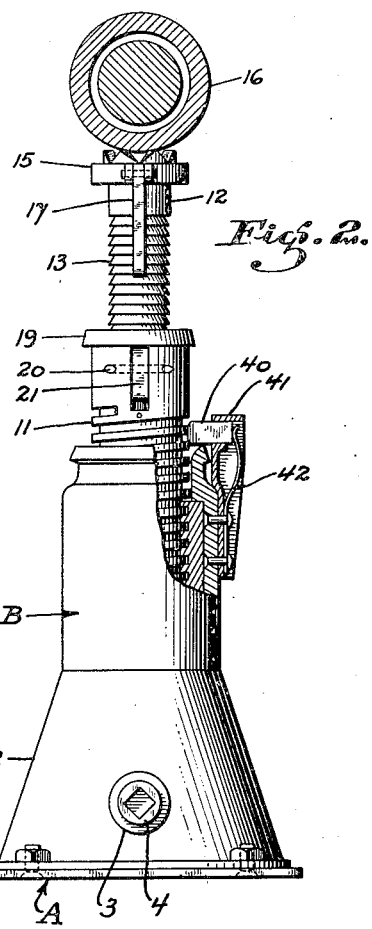
Figure 3:
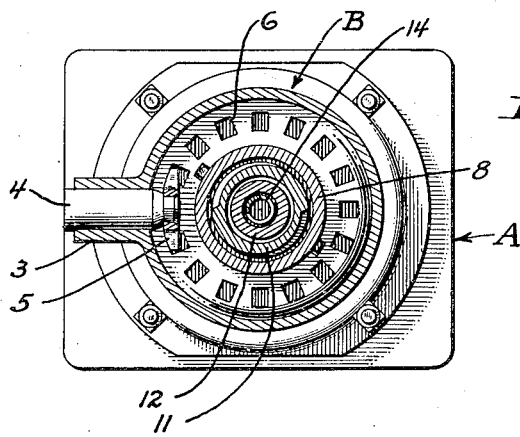

The improved jack, together with the runway and saddle block cooperating therewith, are shown by way of illustration in the accompanying drawings in which:

Fig. 1 is a central vertical sectional view of the jack proper,

Fig. 2 is a side elevation of the jack showing it partly raised, said view being also shown partially in section, Fig. 3 is a plan section taken on line III—III Fig. 1, Fig. 4 is a side elevation of an automobile showing one of the rear wheels supported by the saddle block, Fig. 5 is an end view of an automobile wheel showing the saddle block in position thereunder, said view also showing the jack in engagement with the axle housing, Fig. 6 is a side elevation of Fig. 5, looking in the direction of arrow a.

Fig. 7 is another side elevation showing the special type of driver actuating mechanism.

The improved jack is best illustrated in Figs. 1, 2 and 3. It consists of a base member A, on which is supported a cylindrically shaped upwardly extending housing B, the lower end of the housing being cone shaped, as shown at 2, and the cone shaped portion being provided with a bearing member 3 in which is journaled a drive shaft 4. A pin gear 5 is secured on the inner end of the shaft and this meshes with the pin wheel gear 6, this gear being supported by an end thrust ball bearing 7 and being secured to a sleeve member 8, the upper end of which is internally threaded to form a nut member 9. The sleeve is rigidly secured at its lower end to the gear 6, and it is journalled as at 10 with relation to the upper end of the housing B so as to be rigidly supported, but free to rotate.

Mounted within the sleeve 8 is a sleeve 11, which is externally threaded to intermesh with threads on the nut 9 and mounted within the sleeve 11 is a ratchet sleeve 12, on the exterior surface of which are formed annular ratchet teeth 13. A spring 14 is interposed between the upper end of the ratchet sleeve and the base of the jack, and this spring functions to project the ratchet sleeve, as will hereinafter be described. A jack head 15 is secured to the upper end of the ratchet sleeve, and this head is adapted to engage the axle housing 16, as shown in Fig. 2 when this or the adjacent wheel is to be elevated. The ratchet sleeve is normally held in the retracted position shown in Fig. 1, being retained in this position by means of two latch arms 17, which are pivotally secured to the jack head 15 at the point 18. The latch arms 17 engage an annular shoulder formed on the upper end of the housing B, as shown in Fig. 1. A cam collar 19 is secured to the upper end of the threaded sleeve 11, and below the cam collar is pivotally mounted, as at 20, a pair of spring actuated pawls 21. The lower ends of the pawls engage rounded shoulders 22 in the upper end of the jack housing when the jack members are retracted, as shown in Fig. 1, and when the shoulder 22 is engaged the upper ends of the pawls 21 are thrown out of engagement with the ratchet teeth 13.

On the other hand, if drive shaft 4 is rotated, gears 5 and 6 will rotate and so will the tubular sleeve 8, and as this functions as a nut, due to its upper end being threaded and intermeshing with the threads on the tubular sleeve 11, this sleeve will be elevated or extended. Cam collar 19 will then engage the latch arms 17 and the moment these are released the ratchet bar 13 will be projected in an upward direction, due to the tension of the spring 14. In fact it will be extended until the axle housing is engaged, and it will then be secured as pawls 21 will swing inwardly and engage the ratchet teeth 13. As sleeve 11 continues to raise due to the rotation of the shaft 4 and the gears 5 and 6, the load will be imposed upon the sleeve 11 and the ratchet sleeve 12, and they will move upwardly in unison, thereby elevating the axle housing, together with the wheel supported thereby.

Inasmuch as the nut 9 rotates when the threaded sleeve is being projected or retracted, it is necessary to secure or prevent rotation of the threaded sleeve. This is accomplished in the present instance by providing a friction shoe, such as shown at 40, see Fig. 2. This shoe is mounted in a bracket 41 attached to one side of the jack housing and it is engaged by a spring 42. This exerts such a pressure on the shoe as to produce sufficient friction between the shoe and the threaded sleeve to prevent rotation of the threaded sleeve. The same result may be accomplished by forming a key way in the exterior surface of the threaded sleeve. Either mechanism may do, but as both types of mechanism are already in use no claim is made thereto.

In the present instance it is desired to lift or elevate the wheel a predetermined distance with relation to the ground surface before the jack is operated. It is also desired to provide a support for the jack which will also align it or center it with relation to the axle housing, and it is further desired to provide means whereby the jack may be operated from the side of the car as it is often difficult to operate a jack from the rear end of the car.

In view of the facts stated, I provide a saddle block generally indicated at C, which is best illustrated in Figs. 4, 5, 6 and 7. This block consists of a base section 25, in the upper face of which is formed a recess generally indicated at 26. Formed on opposite sides of the saddle block are recesses or channels 27 which are adapted to receive the hooked ends 28 of a pair of inclined runway blocks 29. The base 25 is hollow and an auxiliary base plate 30 is pivotally secured, as at 31 so the auxiliary base may be swung outwardly to assume the full line position shown in Fig. 5, or inwardly so as to be folded into the hollow lower face of the saddle block.

The auxiliary base 30 is provided with side channels 32, and these are adapted to receive the base plate A of the jack proper, thus forming a support for the jack and also insuring alignment of the jack with relation to the saddle block and the axle housing. A driver shaft is journalled in the saddle block, as indicated at 34. The inner end of the driver shaft is square, as shown at 35, and it is adapted to enter a square socket or recess 36 formed in the outer end of the jack shaft 4. The outer end of the driver shaft is also squared, as shown at 37, so it may be rotated by means of a wrench or by means of a special wrenching tool hereinafter to be described.

In actual operation, if the driver of an automobile wishes to change a tire for any reason whatsoever, he takes the saddle block and swings the base member 30 outwardly, as shown in Fig. 5. He then places the saddle block rearwardly of the wheel to be lifted, and then places the runway blocks in position as shown in Fig. 6. The jack is next placed in position on the base 30. He then gets in the car and backs it up so that the wheel will run up the inclined runway block 29, and as the wheel reaches the top of the runway block it drops into the recess shown at 26. Two shoulders are here presented, as indicated at 45 and 46. These shoulders present quite a recess or hump and serve the function of retaining the wheel and centering it with relation to the saddle block and jack. He stops the car in this position, or in the position shown in Fig. 4. He then gets out and turns the driver shaft 34 either by a wrench or by a special tool which will hereinafter be described. The driver shaft 34 rotates the jack shaft 4, and this in turn rotates the sleeve 8 and the nut 9. The threaded sleeve 11 immediately starts to raise and as it does so it releases the latch arms 17. The moment these are released the ratchet sleeve is automatically projected in an upward direction by means of the spring 14 and the under side of the axle housing 16 is thus engaged. It stops at this point and it is at the same time engaged by the pawls 21. If the operator continues to rotate the driver shaft sleeves 11 and 12 will continue to raise and the wheel will thus become elevated with relation to the saddle block, the operator continuing until the tire clears the saddle block, so the wheel or rim may be removed. A new wheel or rim is then applied, and the driver shaft is rotated in the opposite direction, thus lowering the wheel until it is supported by the saddle block, the shaft 34 being further rotated until the jack head is lowered with relation to the axle housing, when the entire load will be imposed upon the saddle block. The driver or operator then gets in the car and pulls ahead a sufficient distance to clear the saddle block and the runways. He then gets out and removes the runways with relation to the pillow block and the jack with relation to the base plate 30. The different parts may then be placed in the car, for further use, the base being swung in under the saddle block when it is stored away so as to reduce the amount of space required to a minimum.

The advantages of a structure of this character are several. First of all, the wheel to be elevated is given a preliminary lift or raising movement by being run up on the saddle block, thus relieving the jack of that much work. Secondly, it should be noted that when the wheel is in position on the saddle block it is automatically centered with relation to the jack, thereby insuring alignment between the jack and the axle housing. Third, as a connection is made between the driver shaft 34 and the jack, it is possible to operate the jack from the side of the car, this being a great advantage as it is often exceedingly difficult to operate a jack from the rear end of a car. Fourth, an auxiliary base is provided for the jack. This is also important particularly where more or less soft ground is encountered. Fifth, as the jack is slipped into guideways on the base 30, there is no danger of it being knocked or toppling over while the car is being backed into position. Sixth, as the wheel is in position on the saddle block it is possible to remove the runway blocks 29 and place them ahead or behind the other wheels of the car, as shown in dotted lines at 60, see Fig. 4, thus preventing forward or rearward movement of the car while it is being raised.

Reference was previously made to a special ratcheting tool. This is best illustrated in Figs. 5 and 7. It consists of an elongated housing 62, which is provided with a handle 63 at its upper end. A pair of sprocket gears are journalled in opposite ends of the housing, as indicated at 63. These sprocket gears are connected by a chain 64 and the uppermost gear is rotated by means of a crank 65, the rotary motion of the crank being transmitted to the upper sprocket gear and through the chain 64 to the lower sprocket gear. This is provided with a square central opening 66, which is adapted to slip over the outer squared end 37 of the driver shaft 34, hence transmitting rotary motion to the driver shaft 34 and the connecting jack shaft 4, when crank 65 is rotated, thus making it possible to rapidly raise or lower the jack as the case may be.

While certain features of the present invention are more or less specifically described, we wish it understood that various changes may be resorted to within the scope of the appended claims, and similarly, that the materials and finishes of the several parts employed may be such as the manufacturer may decide, or varying conditions or uses may demand.

Having thus described our invention, what we claim and desire to secure by Letters Patent is:

1. In a device of the character described a saddle block, an inclined runway member disposed at each end thereof, a base member connected to one side of the saddle block and adapted to receive and support a jack, and a drive shaft extending through the saddle block and adapted to be connected with the jack to operate the same, said shaft extending through the opposite side of the saddle block a sufficient distance so that it may be engaged for rotation.

2. In a device of the character described a saddle block having a recess formed in its upper surface for the reception of an automobile wheel, inclined runway members detachably secured to opposite ends of the block, a base member pivotally attached to the bottom portion of the block and adapted to be swung to assume a right angular position with relation to the block, said base member having a guideway formed thereon to receive and support a jack and a drive shaft extending through the saddle block and journaled therein, said drive shaft having one end extending so it may be engaged for rotation, and having its opposite end extended for connection with the jack.

3. In combination with a saddle block, a jack detachably secured thereto, said jack being adapted to raise a wheel that is supported by the saddle block, and means extending through the saddle block for operating the jack.

4. In combination with a saddle block having a recess formed in its base, an auxiliary base adapted to be positioned in said recess or beside the saddle block, a jack capable of being supported by said auxiliary base when in the latter position and means on the auxiliary base engageable with the jack to maintain alignment between the jack and saddle block.

5. In combination with a saddle block having a recess formed in its base, an auxiliary base hingedly attached thereto so as to swing from a position within said recess to a position beside the saddle block to form a support for a jack and means for securing the jack to the said auxiliary base.

6. In combination with a saddle block having a recess formed in its base, an auxiliary base hingedly attached thereto so as to swing from a position within said recess to a position beside the saddle block to form a support for a jack, and means for securing the jack with relation to the auxiliary base and saddle block.

7. In combination with a saddle block having a recess formed in its base, an auxiliary base hingedly attached thereto so as to swing from a position within said recess to a position beside the saddle block to form a support for a jack, means for securing the jack with relation to the saddle block, and means extending through the saddle block and engageable with the jack for operating the jack.

8. A vehicle jack aligning and supporting device comprising a block having a saddlelike recess formed thereon to receive and support a vehicle wheel, and means on the block to receive and support a jack, said means aligning with the saddle portion of the block to insure alignment between the jack and the axle of the wheel supported by the block.

9. In a device of the character described, a saddle block having channels formed at opposite sides thereof and inclined runway blocks having hook-shaped members formed on one end for cooperation with said channels to removably secure the runway blocks with relation to the saddle block.

CHARLES H. JOHNSON.
ARTHUR E. MILLER.